May 20, 1958 G. SHAPIRO ET AL 2,835,816

ADJUSTABLE LOW INDUCTANCE CAPACITOR WITH SEPARATELY ROTATABLE SLOTTED DISCS FOR TRACKING ADJUSTMENT

Filed July 24, 1953 3 Sheets-Sheet 1

INVENTORS
GUSTAVE SHAPIRO
JAMES R. FELER

BY [signature]
Walter S. Paul
ATTORNEYS

INVENTORS
GUSTAVE SHAPIRO
JAMES R. FELER
BY
ATTORNEYS

INVENTORS
GUSTAVE SHAPIRO
JAMES R. FELER
BY Walter S. Paul
ATTORNEYS

United States Patent Office 2,835,816

Patented May 20, 1958

2,835,816

ADJUSTABLE LOW INDUCTANCE CAPACITOR WITH SEPARATELY ROTATABLE SLOTTED DISCS FOR TRACKING ADJUSTMENT

Gustave Shapiro and James R. Feller, Washington, D. C., assignors to the United States of America as represented by the Secretary of the Navy Application July 24, 1953, Serial No. 370,237

6 Claims. (Cl. 250—40)

(Granted under Title 35, U. S. Code (1952), sec. 266)

This invention relates to a new type of low inductance variable tuner.

It is an object of the invention to provide a tuning circuit comprising an inductor and a capacitor which may be tuned over a wide range and which may readily be trimmed to correct for tracking errors.

It is another object of this invention to provide a compact low inductance variable capacitor which may be varied over a wide range, and which may be readily and accurately trimmed.

It is still another object of this invention to provide a tuning unit for radio circuits capable of tuning over a wide range and which shall be compact and combine both a variable capacitor and an inductor.

Other objects and features of this invention will become apparent upon the careful consideration of the following detailed description when taken together with the accompanying drawings in which.

Figure 1:
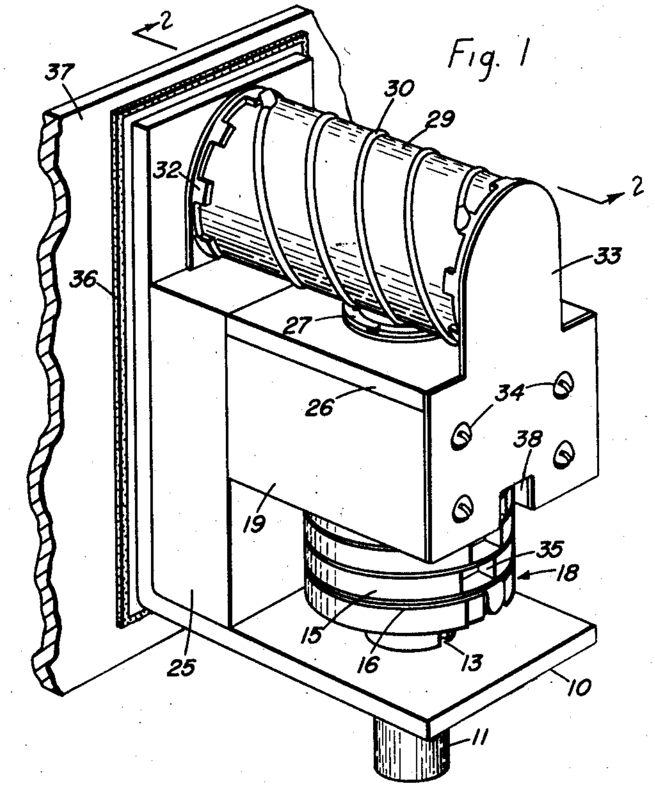
Fig. 1 is an isometric view of a preferred embodiment of this invention.
Figure 2:
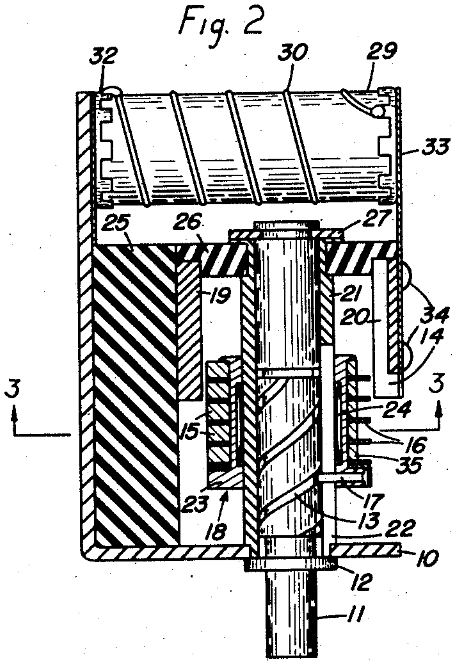
Fig. 2 is a cross sectional view taken along the line 2—2 in Fig. 1.
Figure 3:
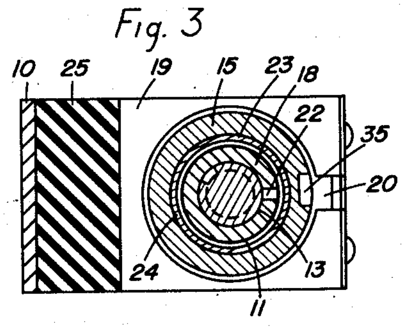
Fig. 3 is a cross sectional view taken along the line 3—3 of Fig. 2.

Referring now to the drawings, and particularly to Figs. 1, 2 and 3, there is shown a fixed inductance 30 and a variable capacitor having a stator plate 19 and a movable core plate assembly 18. 10 denotes a conductive mounting bracket which may be secured by any suitable means to a radio or other grounded chassis 37. A silvered mica strip 36 may be disposed between the bracket 10 and the chassis 37 to provide a capacitive circuit between the bracket 10 and ground. Mounted on the bracket 10 is a mounting block 25 made of an insulating material such as glass bonded mica. The stator 19 (most clearly shown in Fig. 3) is mounted by any suitable means on the block 25 and is provided with a longitudinal slot 20 for a purpose which will be hereinafter described, and a trimming port 14. An insulated support member 26 is positioned by the stator 19 for supporting a cylindrical tubular conductive member 21. The core 18 is slidably mounted on the member 21 for motion along the longitudinal axis thereof.

The core 18 comprises a spool 23 of a conductive material on which are mounted alternately stacked conductive core plates 15 and separators 16. The separators 16 are prevented from rotating with respect to the spool by any suitable means (not shown). The individual plates 15 may, however, be rotated in a manner to be described. Each core plate 15 is provided, as shown most clearly in Fig. 3 with a slot 35, which, under ordinary conditions, is adjacent the stator slot 20. A conductive spring 24 is employed between the spool 23 and the member 21 to electrically connect said members. Within the member 21 is mounted a shaft 11 having threads 13 which may be non-linear. The shaft 11 is supported by the bearing member 12 and a removable bearing member 27, positioned, as shown, at each end of said shaft. The spool 23 is provided with a pin 17, fixedly mounted in any convenient manner and extending through the slot 22 in the member 21 and adapted to engage the thread 13.

The fixed inductance 30, which may be supported on an insulated form 29, is conveniently mounted over the capacitor by means of spring clips 32 and 33. The spring clip 32 is mounted on the base plate 10, while the spring 33 is attached by means of screws 34 to the stator 19. The spring 33 is provided with a notch 38 opposite the trimming port 14.

Figure 7:
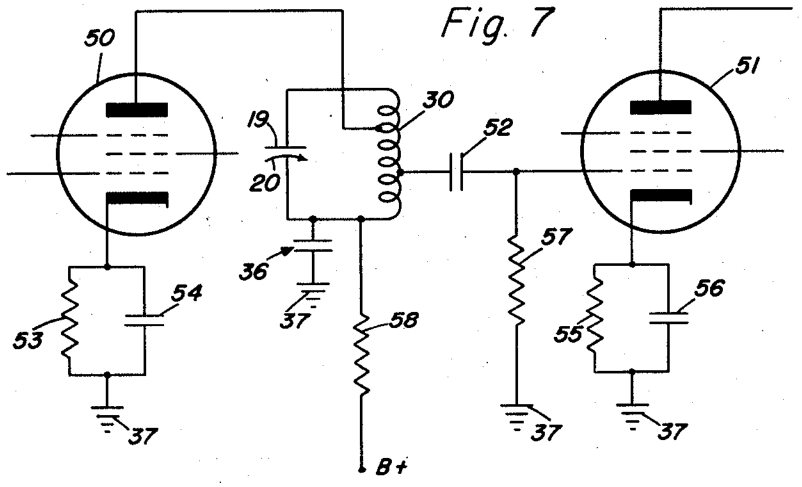
Fig. 7 shows a typical circuit in which the embodiment of this invention as shown in Fig. 1 may be employed.

The operation of the structure shown in Figs. 1–3 inclusive is as follows:

Since the core 18 is constrained from rotation around the tubular member 21, by the pin 17 which engages slot 22, rotation of the shaft 11 will cause a longitudinal motion of the core assembly 18 along the axis of the member 21. As the individual plates 15 of the core 18 enter the stator 19, the capacitance is increased. In a tuned circuit, such as shown in Fig. 7, for example, tracking errors may occur. To correct these errors, as each individual plate 15 enters the stator 19, it may be rotated in a clockwise or counter-clockwise direction so as to change the relative position of its core plate slot 35 and the stator slot 20. Rotation of a core plate which has just entered the stator is accomplished by inserting an instrument or key through the port 14 and pushing the plates in the desired direction thereby changing the capacitance between a plate and the stator. The provision of the fixed separator elements 16 permits the individual plates 15 to be rotated without reaction upon an adjacent plate.

The schematic representation of this invention is illustrated in Fig. 7 wherein a conventional two stage amplifier circuit is shown. The output of a pentode 50, having a biasing network comprising the resistor 53 and the condenser 54, is applied to the tuning structure illustrated in Fig. 1 at a point on the fixed inductance 30 which is connected to the stator 19 and the other end to the core 18. The core 18 is connected to ground 37 through the silvered mica strip 36. The B+ supply may be connected to the core through resistor 58. The output from the tuned circuit may then be applied in a conventional manner to the grid of a second pentode 51 through the condenser 52. The pentode 51 has been shown with a conventional biasing arrangement comprising the grid resistor 57 and the cathode network comprising the resistor 55 and the condenser 56.

In tracing the electrical connection of the elements, reference is again made to Fig. 2 wherein it is seen that one end of the inductor 30 is conductively connected to the spring clip 32 and the other end to the spring clip 33.

The spring clip 33 makes a direct electrical contact with the stator 19, while the connection of the core 18 to the spring clip 32 is made through the spool 23, the conductive member 21, and the mounting plate 10. The mounting bracket 10 is coupled to the chassis 37 through the silvered mica strip 36 which functions as a fixed capacitor.

Figures 4, 5, 6:
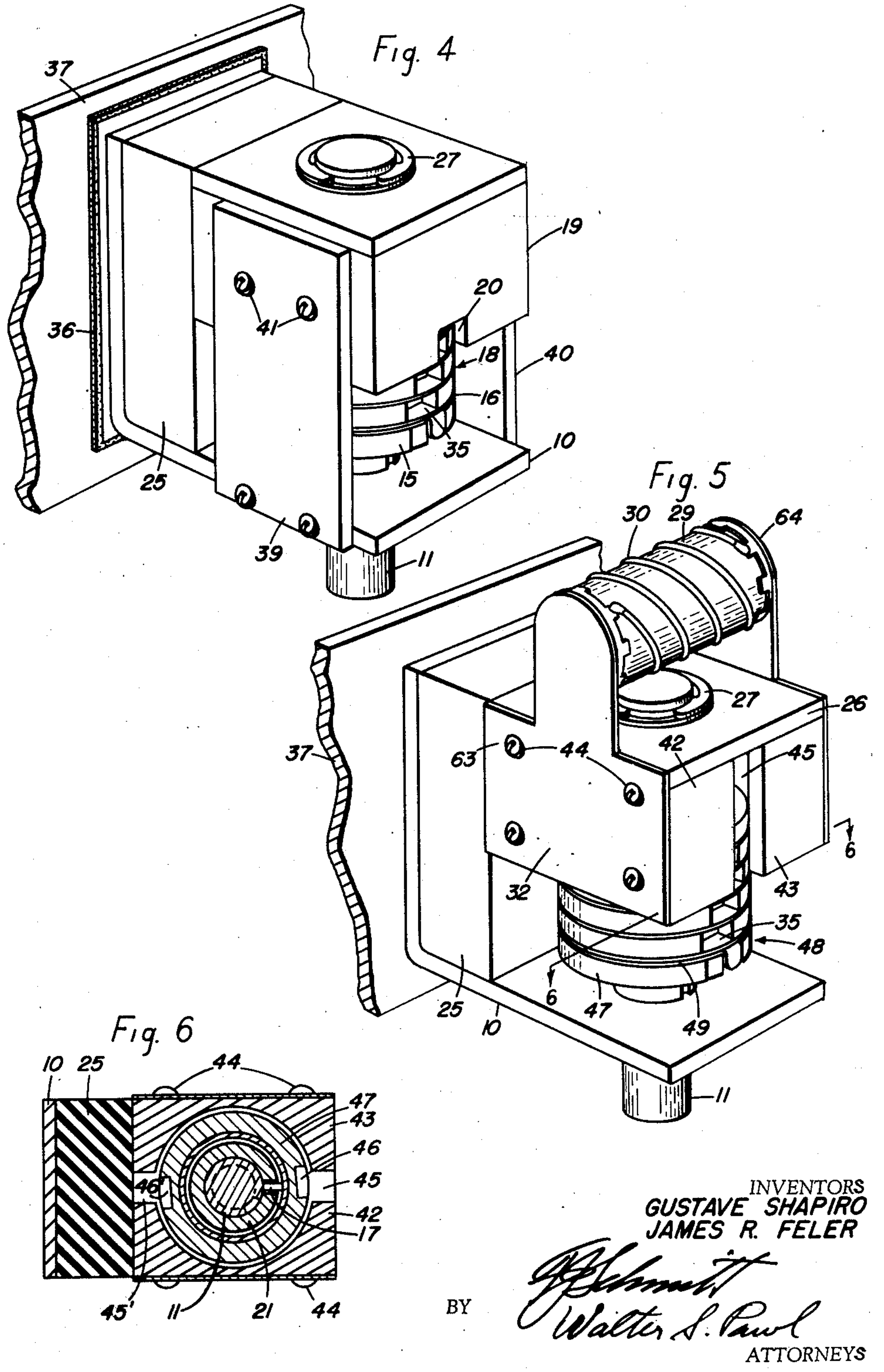
Fig. 4 is an isometric view of another embodiment of this invention showing a high frequency tuner.
Fig. 5 is an isometric view showing a balanced tuner comprising a third embodiment of this invention.
Fig. 6 is a cross sectional view taken along the line 6—6 of Fig. 5.
Figure 9:
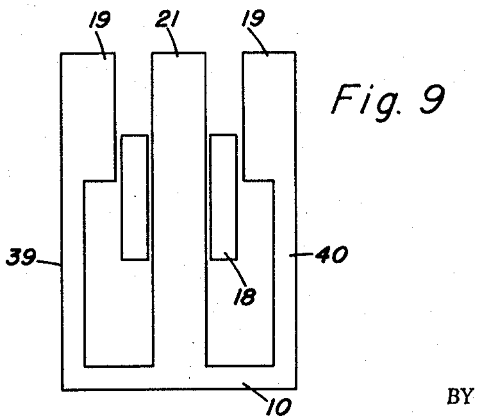
Fig. 9 shows a diagrammatic representation of the embodiment of Fig. 5.

The embodiment of this invention illustrated in Fig. 4 is schematically represented in Fig. 9 wherein is shown a high frequency transmission line shorted at one end by bracket 10 and composed of an inner conductor 21, and an outer conductor. The outer conductor is made up of the conductive legs 39 and the stator 19. A tuning conductive cylinder, comprising the cylinder 18, is disposed around the inner conductor 21 and is arranged for longitudinal motion thereon. It is clear from the drawing, that movement of the cylinder 18 in an upward direction will cause an increase in distributed capacity of the transmission line, as well as a decrease in the inductance of the line. We have, therefore, a system which simultaneously varies the capacitance and the inductance of a tuned circuit. The structure for accomplishing these results is shown in Fig. 4 to which reference is now made.

The embodiment shown in Fig. 4 is in all respects identical to the embodiment shown in Fig. 1, with the following exceptions. First, the fixed inductor 30 and the spring clips 32, 33 have been removed and second, the conductive legs 39 and 40 have been mounted on the stator 19 and supporting bracket 10 by screws 41, as shown, or any suitable means. The mechanical operation in regard to the longitudinal movement of the core 18 and the trimming of the rotor plates 15 is identical in all respects with the embodiment of Fig. 1.

Figure 8:
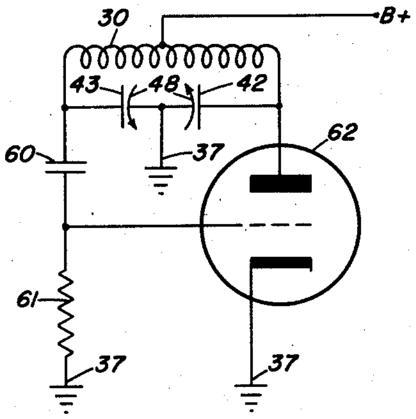
Fig. 8 shows a typical circuit employing the embodiment of Fig. 6.

For a better understanding of the balanced tuner comprising embodiment of this invention illustrated in Figs. 5 and 6, reference should now be made to the schematic representation of said embodiment in Fig. 8. In this figure is shown a tank circuit consisting of an inductor 30 in parallel with a split stator capacitor comprising stators 42 and 43 and movable core 48. The core element 48 is connected to ground 37, and a point on inductor 30, which is at a common R. F. potential with core 48, is connected to a B+ supply, One end of the tank is connected, as shown, to the plate of triode 62, and the other end of the tank circuit is connected to the grid of triode 62 through the D. C. blocking capacitor 60. The cathode of the triode is connected directly to ground, while the grid is grounded through grid leak resistor 61. The structure shown in Figs. 5 and 6 consists of the inductor 30 and the split stator capacitor comprising stator plates 42 and 43 and having a core 48.

In Figs. 5 and 6 is shown a structure similar to that of Fig. 1. In this figure, however, is shown a split stator type capacitor. As in Fig. 1, there is shown a conductive mounting bracket 10 mounted on the grounded chassis 37. The silvered mica strip, shown in Figs. 1 and 4, has been omitted. Mounted in any convenient manner on the plate 10 is a mounting block 25 to which the split stators 42 and 43 are fixedly mounted. Gaps 45, 45' are provided between the split stators 42 and 43. As explained in the description of the embodiment illustrated in Figs. 1–3, the insulating member 26 is mounted on the stator sections 42 and 43 for supporting the hollow cylindrical member 21, in which the screw shaft 11 is positioned. The core 48, consisting of alternately stacked conductive plates 47 and separators 49, is positioned on the tubular member 21 in the same manner described for the embodiment of Fig. 1. In this case, however, while the separators 49 are of the same construction and secured in the same manner as the separators 16 of Fig. 1, it is seen that the plates 47 differ from the plates 15 in that each of plates 47 is provided with two slots 46, 46'. Under normal operating conditions, the slots 46, 46' are adjacent the gaps 45, 45' between the stator sections 42 and 43. By rotating the core plates 47, it is seen that the capacity between the core plates and the sections 42, 43 of the split stator may be simultaneously varied. It is seen that one end of the inductor 30 is connected through the spring clip 63 which is mounted by means of screws 44 to the stator section 42, and that the other side of the inductor 31 is connected through the spring clip 64, which is similarly mounted on stator section 43. The core 48 is connected to ground through the supporting plate 10.

Although it has not been illustrated, it is clear that the split stator capacitor illustrated in Figs. 5 and 6 may be employed as a balanced high frequency tuner similar in construction to that of Fig. 4, by substituting the legs 39 and 40 for the inductor 30.

From the foregoing description of three of the preferred embodiments of this invention, it appears clear that a very versatile and compact tuning structure has been developed. Each of the embodiments employs a core which, in appearances, resembles a tumbler lock. By adjusting the tumblers or plates of the core, the tuning curve of the structure may be varied. In actual operation, each tumbler would be manually rotated after it has just entered the stator to correct for tracking errors.

The invention described herein may be manufactured and used by or for the Government of the United States of America for governmental purposes without the payment of any royalities thereon or therefor.

What is claimed is:

1. A variable capacitor having a fixed stator and a movable core, said stator comprising a conductive block having a bore of circular cross section therein, said stator having a slot connecting said bore and the outer surface of said stator; said core comprising a cylindrical support member, a plurality of aligned rotatable conductive discs stacked on said support member, each of said conductive discs having at least one recessed portion in its peripheral region in juxtaposition with said slot whereby said discs may be individually rotated to change the local slope of the capacitance versus longitudinal motion characteristics, and means for moving said core in said bore along the longitudinal axis thereof.

2. A variable tuning element comprising in combination: a pair of fixedly mounted spaced conductive blocks having opposed semi-cylindrical concave surfaces; a fixed tubular sleeve insulated from said blocks and mounted between said blocks along the longitudinal axis thereof; a longitudinal slot in said sleeve; a threaded shaft rotatably mounted within said sleeve; a movable conductive member comprising a spool movably mounted on said sleeve, a drive pin fixedly mounted on said spool and extending through said slot and engaging the thread of said shaft, a plurality of independently rotatable conductive discs and a plurality of fixed conductive separators alternately stacked on said spool, each of said rotatable discs having a pair of diametrically opposed recessed portions in the peripheral region thereof and in juxtaposition with the spaces between said blocks, and having a maximum diameter less than the minimum distance between the opposed concave surfaces of said blocks, whereby rotation of said shaft drives said movable conductive member along the axis of said concave surfaces, thereby simultaneously changing the capacity between the concave surface of each of said blocks with respect to said moveable conductive member, and whereby the selective rotation of each of said rotatable discs further changes the said capacity by a small amount.

3. A variable tuning device comprising in combination: a conductive mounting base, an insulated mounting block mounted on said base, a stator element mounted on said block, said stator element comprising a conductive element having a circular bore therein, the conductive element surrounding said bore having a longitudinal recess therein, a core element mounted on said conductive mounting base in aligned relationship with said bore, said core comprising a conductive sleeve having a longitudinal slot therein and mounted on said base, said sleeve extending within said bore, a threaded rotatable shaft mounted within said sleeve, a spool moveably mounted on said sleeve, a plurality of rotatable plates and separators alternately stacked on said spool, means for preventing rotation of said separators, each of said rotatable plates having a recessed portion in the peripheral region thereof, pin means fixedly mounted on said spool and extending through said slot and engaging the threads of said shaft, and an inductance electrically mounted between said conductive base and said stator element.

4. A low inductance variable capacitor comprising in combination a fixed stator comprising a conductive member having a bore, said stator having a longtiudinal slot connecting said bore and the outer surface of said stator, a core moveable within said bore along the longitudinal axis thereof to vary the capacitance between said stator and core, said core comprising a stack of aligned, individually rotatable discs, each of said discs having a slot in the peripheral region thereof, whereby each disc may be rotated to move the slot thereof relative to the slot of the stator to provide trimming of the capacitor.

5. A variable capacitor comprising in combination: a fixed stator and a moveable core, said stator comprising a solid conductive member having a cylindrical bore extending through one wall of said member, another wall of said member having a port extending therethrough and intersecting said bore, said member having a slot extending from said port with its longitudinal axis parallel to the longitudinal axis of said bore, said moveable core comprising a spool having a plurality of aligned rotatable conductive discs mounted thereon, means for moving said moveable core in and out of said core to provide different values of capacitance between the core and said stator, and means on each of said rotatable discs cooperating with said slot to trim said capacitor.

6. The combination as defined in claim 5 wherein the longitudinal dimension of each of said discs is the same as the longitudinal dimension of said port.

References Cited in the file of this patent

UNITED STATES PATENTS

| | | |
|---|---|---|
| 1,512,398 | Browne | Oct. 21, 1924 |
| 1,508,647 | Cornelius | Sept. 16, 1924 |
| 1,678,840 | Williams | July 31, 1928 |
| 1,735,889 | Blough | Nov. 19, 1929 |
| 2,147,425 | Bock | Feb. 14, 1939 |
| 2,250,366 | Frisbee | July 22, 1941 |
| 2,398,721 | Rogers et al. | Apr. 16, 1946 |
| 2,432,089 | Carter et al. | Dec. 9, 1947 |
| 2,482,393 | Wilburn | Sept. 20, 1949 |
| 2,540,196 | Fisher | Feb. 6, 1951 |
| 2,591,717 | Page | Apr. 8, 1952 |
| 2,639,388 | Matare | May 19, 1953 |
| 2,673,933 | Morton | Mar. 30, 1954 |
| 2,715,681 | Campbell | Aug. 16, 1955 |

FOREIGN PATENTS

| | | |
|---|---|---|
| 458,710 | Great Britain | Dec. 24, 1936 |